United States Patent
Tsuruta et al.

(10) Patent No.: US 11,460,009 B1
(45) Date of Patent: Oct. 4, 2022

(54) ACTUATOR FOR HOLDING AN OBJECT

(71) Applicant: Toyota Motor Engineering & Manufacturing North America, Inc., Plano, TX (US)

(72) Inventors: Ryohei Tsuruta, Ann Arbor, MI (US); Shardul Singh Panwar, Ann Arbor, MI (US); Umesh N. Gandhi, Farmington Hills, MI (US); Brian J. Pinkelman, Ann Arbor, MI (US); Paul A. Gilmore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/208,105

(22) Filed: Mar. 22, 2021

(51) Int. Cl.
| F03G 7/06 | (2006.01) |
| B25J 15/02 | (2006.01) |
| F16K 31/02 | (2006.01) |

(52) U.S. Cl.
CPC .............. *F03G 7/065* (2013.01); *B25J 15/02* (2013.01); *F16K 31/025* (2013.01)

(58) Field of Classification Search
CPC ....................................................... F03G 7/065
USPC .................................................. 60/526–528
See application file for complete search history.

(56) References Cited

U.S. PATENT DOCUMENTS

| 6,546,806 B1* | 4/2003 | Varma ........................ G01L 1/22 73/766 |
| 8,998,320 B2 | 4/2015 | Mankame et al. |
| 9,180,525 B2 | 11/2015 | Park et al. |
| 2004/0261411 A1* | 12/2004 | MacGregor ............. F03G 7/065 60/527 |
| 2005/0210874 A1* | 9/2005 | Browne .................. F03G 7/065 60/527 |
| 2008/0272259 A1 | 11/2008 | Zavattieri et al. |
| 2009/0009656 A1* | 1/2009 | Honda ..................... F03G 7/065 60/527 |
| 2009/0108607 A1* | 4/2009 | Browne ................. B60N 3/023 296/1.02 |

(Continued)

FOREIGN PATENT DOCUMENTS

| JP | 4273902 B2 | 6/2009 |
| KR | 101931791 B1 | 12/2018 |

(Continued)

OTHER PUBLICATIONS

Jitosho et al., "Exploiting Bistability for High Force Density Reflexive Gripping" 2019 International Conference on Robotics and Automation Montreal, QC, Canada, pp. 1241-1247.

(Continued)

*Primary Examiner* — Shafiq Mian
(74) *Attorney, Agent, or Firm* — Christopher G. Darrow; Darrow Mustafa PC

(57) ABSTRACT

Systems and methods relate to a manner of improving an actuator used to hold an object. In one embodiment, an actuator includes a body that is bi-stable with a coiled state and an uncoiled state. The actuator also includes a strip, coupled to the body, that coils the body according to a power source that activates in response to a detected proximity of an object. The actuator also includes a wire coupled to a side of the body opposite from the strip and the wire uncoils the body in response to heat caused by the power source.

20 Claims, 3 Drawing Sheets

(56) References Cited

U.S. PATENT DOCUMENTS

| | | | |
|---|---|---|---|
| 2009/0218858 A1* | 9/2009 | Lawall | B60N 2/4235 |
| | | | 297/284.9 |
| 2010/0192567 A1* | 8/2010 | Butera | F03G 7/065 |
| | | | 60/528 |
| 2012/0136126 A1 | 5/2012 | Rousseau | |
| 2012/0237309 A1 | 9/2012 | Park et al. | |
| 2013/0011806 A1* | 1/2013 | Gao | F03G 7/065 |
| | | | 432/37 |
| 2014/0338324 A1* | 11/2014 | Jasklowski | F02K 1/1207 |
| | | | 60/527 |
| 2015/0202993 A1 | 7/2015 | Mankame et al. | |
| 2015/0274078 A1 | 10/2015 | Alacqua et al. | |
| 2018/0286189 A1 | 10/2018 | Motamedi et al. | |

FOREIGN PATENT DOCUMENTS

| | | |
|---|---|---|
| WO | 2020110091 A2 | 6/2020 |
| WO | 2020183360 A1 | 9/2020 |

OTHER PUBLICATIONS

Unknown, "Slap bracelet," 2 pages, last accessed on: Mar. 12, 2021, found at https://en.wikipedia.org/wiki/Slap_bracelet.
Dieter Stoeckel, "Shape memory actuators for automotive applications," Materials & Design, vol. 11, issue 6, pp. 302-307, 1990.
Strittmatter et al., "Intelligent materials in modern production—Current trends for thermal shape memory alloys," Procedia Manufacturing, vol. 30, pp. 347-356, 2019.
Chris Shunk, "GM awarded DOE money to research Shape Memory Alloy heat engines," Autoblog, 5 pages, Nov. 2, 2009.
Maffiodo et al., "Three-Fingered Gripper with Flexure Hinges Actuated by Shape Memory Alloy Wire," Int. J. of Automation Technology, vol. 11, No. 3, pp. 355-360, Nov. 2017.

* cited by examiner

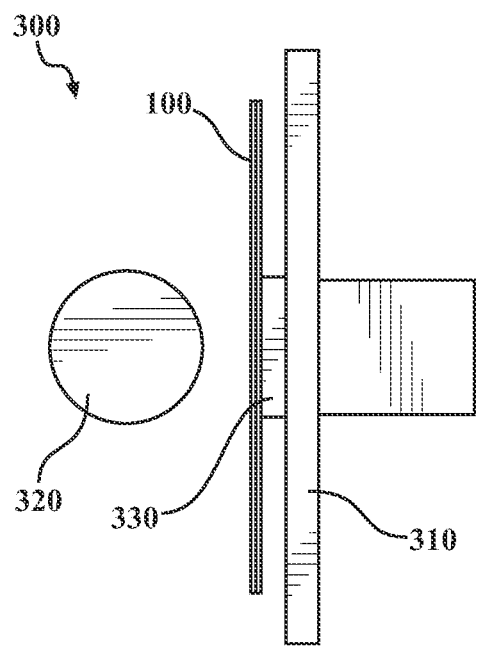
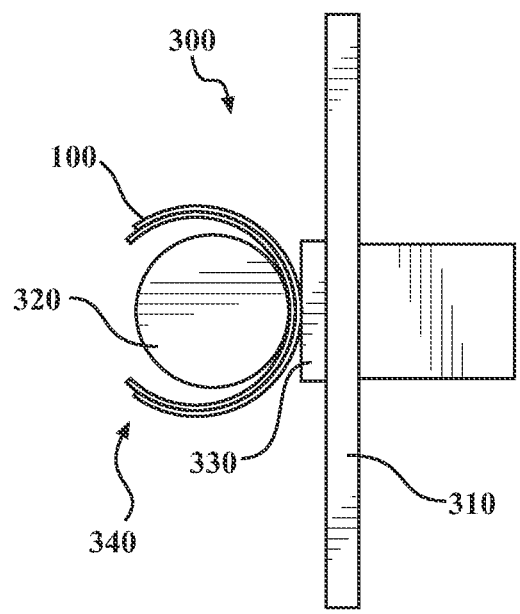
FIG. 3A
FIG. 3B
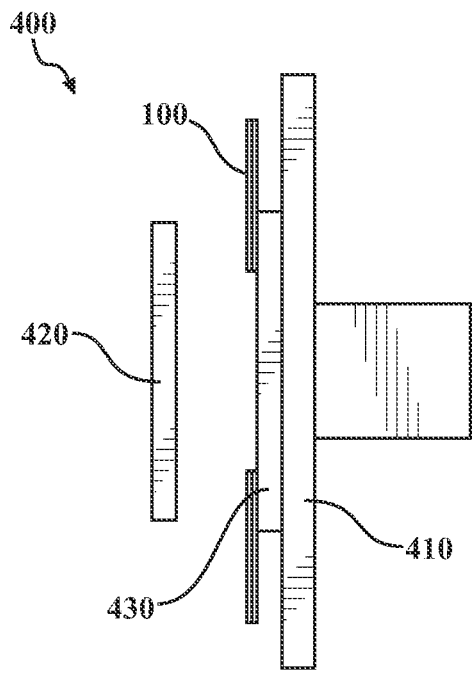
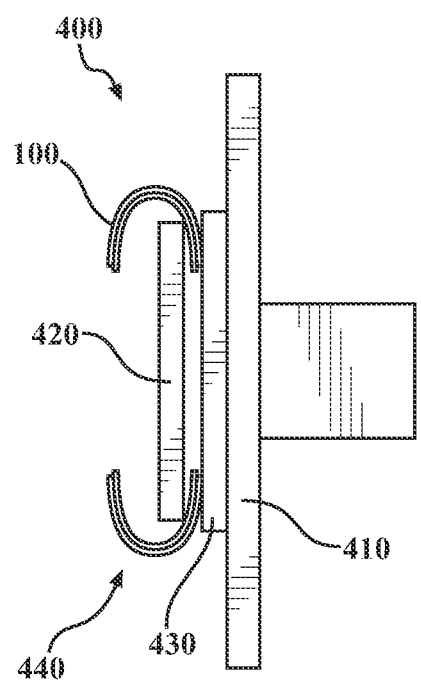
FIG. 4A
FIG. 4B

ACTUATOR FOR HOLDING AN OBJECT

TECHNICAL FIELD

The subject matter described herein relates, in general, to actuators, and, more particularly, to actuators using memory alloys for holding an object.

BACKGROUND

An actuator is a machine component that may control a mechanism to move in a system. For example, an actuator may open a valve, close a mechanical switch, regulate flow, and so on. Some actuators operate by using a power convertor to convert energy, such as electrical energy, into a mechanical force. Solenoids or electric motors are electromagnetic actuators that use electricity to operate a mechanical load. Pneumatic actuators use air to operate a mechanical load. In addition, a system may use a controller to ensure the correct functioning of input quantities and output action by solenoid or pneumatic actuators.

Systems using actuators are becoming smaller and lighter. Solenoids, electronic motors, and other actuators are needed to meet certain size and weight parameters for use on a mobile device, vehicle, and so on. However, these actuators may be too bulky and heavy for certain applications. Furthermore, battery usage of a mobile device or vehicle may be impacted by the materials and design of actuators. For example, actuators in auxiliary systems of an electric vehicle may impact range during increased usage of windows, power seats, and so on. Thus, actuators may be bulky, heavy, or inefficient for certain applications.

SUMMARY

In one embodiment, example systems and methods relate to a manner of improving an actuator used to hold an object. In various implementations, actuators may use power levels that limit usage in mobile devices or vehicles. Furthermore, actuators may also be bulky and mechanical, thereby adding weight to battery-operated devices or vehicles and increasing manufacturing costs. Accordingly, an actuator may have a design that uses materials and a purpose-built body that is bi-stable to reduce power consumption and weight for battery-operated devices or vehicles. In particular, a wire and a strip made of a memory alloy (MA) on the body may uncoil and coil to grasp an object, such as a cup or mobile device, according to a detected size or weight. As a benefit, the MA is lighter than a motor and remains in a state or shape without additional energy. In this way, the actuator in the battery-operated device or the vehicle is lighter and uses less power to hold or release an object.

In one embodiment, an actuator includes a body that is bi-stable with a coiled state and an uncoiled state. The actuator also includes a strip, coupled to the body, that coils the body according to a power source that activates in response to a detected proximity of an object. The actuator also includes a wire coupled to a side of the body opposite from the strip and the wire uncoils the body in response to heat caused by the power source.

In one embodiment, an actuator includes a bi-stable body associated with an active state and an inactive state. The actuator also includes a MA part, coupled to the bi-stable body, that bends the bi-stable body by entering the active state in response to a detected proximity of an object. The actuator also includes a MA body on a side of the bi-stable body opposite from the MA part and the MA body straightens the bi-stable body to enter the inactive state in response to heat triggered by a power source.

In one embodiment, an actuator system includes bi-stable actuators. The actuator system also includes MA parts, coupled to two or more of the bi-stable actuators, that separately trigger a bend by the two or more bi-stable actuators and an active state in response to proximity of an object. The actuator system also includes MA bodies coupled to the two or more bi-stable actuators that separately cause the two or more bi-stable actuators to enter an inactive state in response to heat triggered by a power source, wherein a controller activates the heat to enter the inactive state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 3A and 3B illustrate one embodiment of an actuator used in a system to hold an object.

FIGS. 4A and 4B illustrate one embodiment of a system using an actuator to hold a mobile device.

DETAILED DESCRIPTION

Embodiments associated with improving an actuator using memory alloys (MA) to hold an object are disclosed herein. An actuator may use lightweight and compact MAs to hold or release a cup, a mobile device, or object of various sizes. The actuator may morph or change shape to firmly grip the cup or the mobile device. In one approach, the body of the actuator may be a metal that is bi-stable with a coiled state and an uncoiled state that a controller activates to hold or release the object. In association with actuation, the controller may activate a power source to heat a strip composed of a MA or a shape memory alloy (SMA) and spring the body into the coiled state. In this way, the controller may remotely increase the force to hold an object according to shape, size, or weight. Correspondingly, the coiled body and strip may maintain a stable shape without additional heat or energy, benefiting systems with limited energy (e.g. electric vehicles).

Furthermore, the controller may automatically uncoil another strip or a wire on the side of the body opposite from the strip by activating the power source to apply voltage for heating. For example, the wire contracts from the heat causing the body to straighten and enter the uncoiled state. In this state, the uncoiled body may reduce force to release a grip on the cup or the mobile device. Furthermore, the uncoiled body and wire may maintain a stable shape without additional heat or energy. Thus, the actuator using MAs may be smaller, lighter, and more energy-efficient than solenoid actuators thereby improving systems particularly in electric vehicles.

Figure 1A:
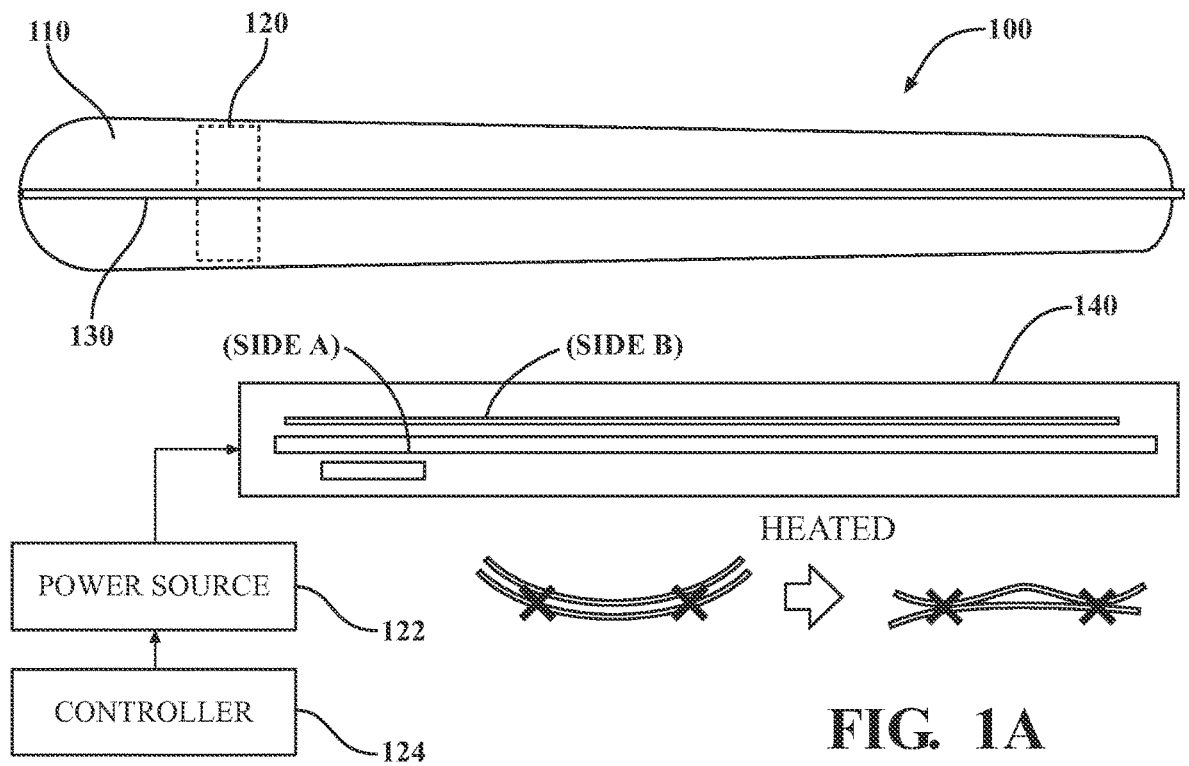
FIG. 1A illustrates one embodiment of an actuator that is bi-stable and includes memory alloy (MA) or shape memory alloy (SMA) components.

FIG. 1A illustrates one embodiment of an actuator 100 that is bi-stable and includes MA or SMA components. The body 110 of the actuator 100 may be a strip composed of metal, steel, composite, and so on arranged in a substantially thin shape to be lightweight and bi-stable. For example, a bi-stable arrangement may comprise the body transitioning into a coiled state or uncoiled state. In addition, a bi-stable arrangement may also comprise the body transitioning into an active state when bent or an inactive state when substantially flat. In one approach, the outer layer of the body 110 may be covered in a plastic, silicon, composite, cloth, and so on material. Regarding actuation, the body 110 may cause mechanical stimulus from a springing or recoiling action. Furthermore, the body 110 may be a strip that is substantially elongated, rectangular, tapered, or the like according to packaging parameters such as length, width, depth, or weight.

Regarding form and parts, the actuator 100 may include MA or SMA components for substantially coiling or uncoiling the body 110. A MA or SMA material is lightweight and compact resulting in more basic packaging than a solenoid, pneumatic, and so on based actuation. For example, a MA or SMA component may be 50%-60% lighter than similar components and readily controlled through low voltage and current flow. Regarding composition, the MA or the SMA component may be composed of nickel, titanium, tungsten, or another metal alloy.

For actuation or triggering, the component 120 may be a strip composed of MA or SMA material that contracts when heated by a power source 122 to spring, recoil, or trigger the body 110 into the coiled state. The component 120 may be positioned at an end of the body 110. When heated, the component 120 may contract. Conversely, the component may expand through cooling. Regarding needed energy from the power source 122, the actuator 100 may utilize a circuit that applies voltage when activated by a controller 124 to opposite ends of the component 120. In one approach, a MA or SMA material may contract, shrink, deform, bend, stretch, expand, form a shape, and so on according to parameters such as the amount of material, length, area, density, and so on of the component. For example, in various implementations, a voltage level of 2V-12V causes current flow for electric heating of the MA or SMA to 60° C.-90° C. with a reaction time for contraction or actuation that varies according to the parameters.

Figure 1B:
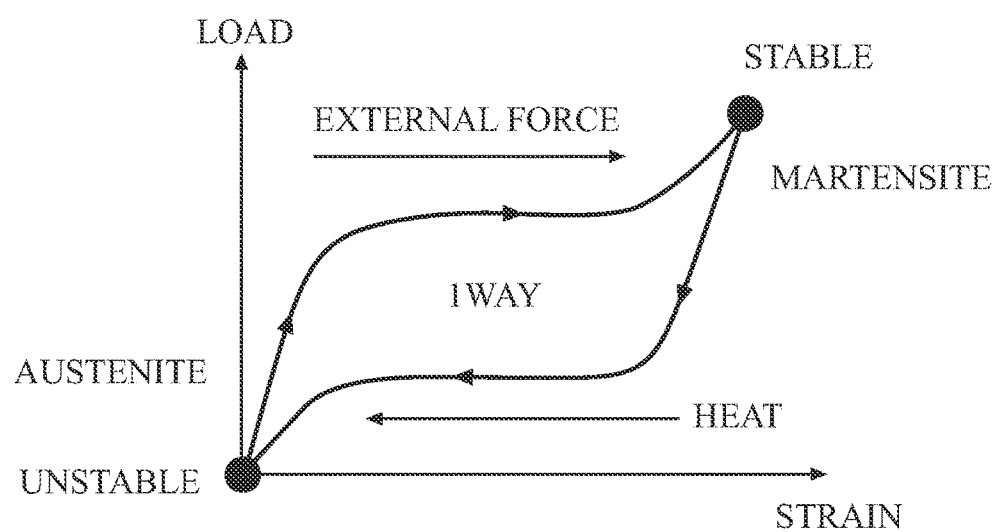
FIG. 1B illustrates the thermodynamic properties of a MA or a SMA.

Turning to changes in shape, phase, or activity by the actuator 100, FIG. 1B illustrates the thermodynamic properties of a MA or a SMA. The heating may cause a phase change of the MA or SMA from martensite to austenite at a rate according to the parameters such as length, area, density, and so on. A martensite phase is a reversible transformation of a crystalline structure related to the cooling of a MA or SMA. Correspondingly, the cooling of the MA or SMA to the martensite phase may cause a decrease in density. Regarding static applications, the martensite phase may handle higher loads or strains than the austenite phase, thereby being more applicable for certain applications requiring support.

Concerning the use of heat, the component 120 begins heating beyond a certain threshold when a power source applies voltage. In response, the MA or SMA enters the austenite phase having increased density. For example, in various implementations, the austenite phase may be denser than the martensite phase by approximately 1.08 times. The MA or SMA may maintain or remain in the austenite phase in a certain shape or form without further heating or energy from the power source 122. However, an external force may cause or trigger a transition from the austenite to martensite phase since austenite may be a substantially unstable state.

Furthermore, a MA or SMA may change up to 8% from an original shape, such as by contraction. The MA or SMA material through the shape change may provide actuation by an elastic modulus of up to 70 giga pascals (GPa) of pressure or force. Therefore, the actuator 100 may provide an output or force greater than a solenoid actuator at up to ⅓ the amount of steel using MA or SMA material. The actuator 100 may use MA or SMA material at a volume of up to 6 grams/centimeters (cm)^3 that is similar to steel.

For the actuator 100, the component 130 may be a wire, flat body, strip, or other MA or SMA component that substantially flattens or straightens the body 110 from a substantially coiled, bent, stretched, rounded, curled, and so on shape when heated by voltage from the power source 122. For example, a wire that is compact at 0.1 millimeters (mm)-0.5 mm may result in a lightweight and basic form for the actuator 100. In various implementations, the component 130 may couple or fasten to the ends of the body 110 to create tension or pressure points. Now referring to the view 140, the component 120 may be on Side A and the component 130 on an opposite Side B. In one approach, the power source 122 may be a circuit that applies voltage at the ends of the body 110 to the component 130 to cause current flow and heating. As a result, as the component 130 heats the MA or SMA material contracts causing the body 110 to substantially flatten or straighten.

Figure 2:
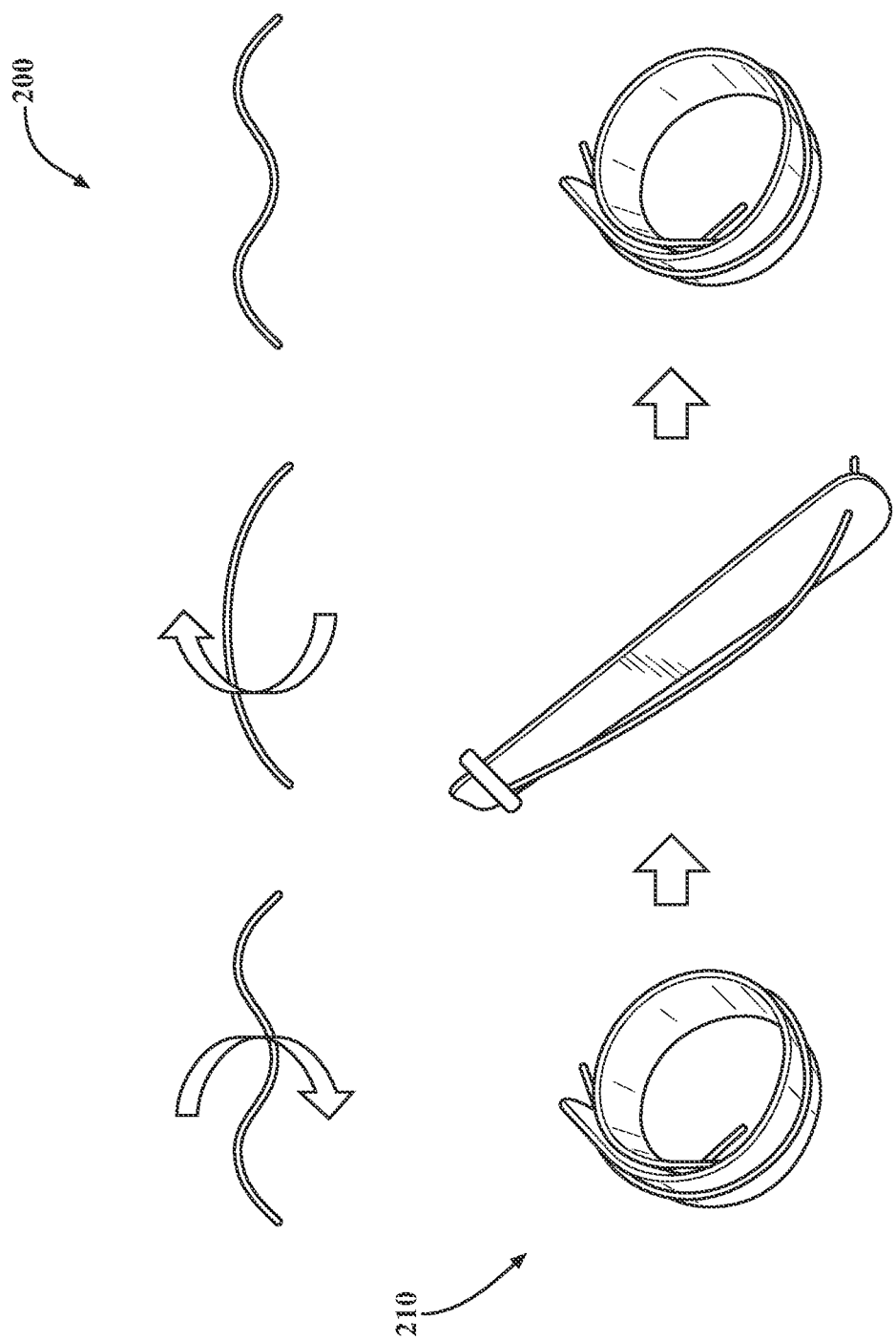
FIG. 2 illustrates an example of a bi-stable actuator with a coiled state and an uncoiled state.

Turning now to FIG. 2, an example of a bi-stable actuator 200 with a coiled state and an uncoiled state is illustrated. Here, the bi-stable actuator 200 may transition between states 210 in response to heating or cooling of MA or SMA components. For example, heating the component 130 may cause the bi-stable actuator 200 to transition from a substantially coiled, bent, stretched, rounded, curled, and so on shape to a substantially flattened or straightened shape. In one way, the transition of the bi-stable actuator 200 may be similar to a cantilever, where the MA or SMA applies a force to substantially the center of the body 110. Regarding flattening or straightening, the related rate may depend on the MA or SMA material and related parameters. For example, the parameters may be length, area, density, and so on. To consider another state change, heating the component 120 may cause the bi-stable actuator 200 to revert or reverse to a substantially coiled, bent, stretched, rounded, curled, and so on shape. Furthermore, the bi-stable actuator 200 may remain or maintain actuation in a shape without additional heating, energy, or power to the MA or SMA components.

Regarding FIG. 3A, one embodiment of the actuator 100 used in a system to hold an object is illustrated. Regarding composition, the holder 300 may include a body 310 composed of metal, plastic, composite, and so on. In various implementations, the holder 300 may be attached to the dashboard, console, panel, vent, and so on of a vehicle. In one approach, the holder 300 may be universal by holding cups or beverages of various sizes thereby providing customization.

Furthermore, the holder 300 may include a proximity sensor(s) 330 that uses ultrasonic, optical, pressure, heat, magnetic, and so on sensing. When the proximity sensor(s) 330 detects the object or the cup 320 near the body 310, the controller 124 may activate the power source 122. In one approach, the proximity sensor(s) 330 may use ultrasonic or optical detectors to identify a shape of the object or the cup 320 through image recognition, thereby improving the accuracy of activation. For sensing, the body 310 may include a touch sensor(s) or a pressure sensor(s). The touch sensor(s) may detect touch by changes in surface resistance or capacitance. Regarding pressure, a pressure sensor(s) may detect a push or a pull on the body 310 or the body 110 of the actuator 100. Correspondingly, the pressure sensor(s) may also detect a force or weight of an object near the holder 300. As a result, the controller 124 may use signals from the proximity sensor(s) 330 with any detected touch or pressure to activate the power source 122 to prevent erroneous triggering.

In FIG. 3A, the component 120 of the actuator 100 may be heated by the power source 122 applying a voltage in response to activation by the controller 124. Correspondingly, in FIG. 3B the component 120 may spring, recoil, or trigger the body 110 into the coiled state 340 once heating beyond a certain threshold causes contraction of the component 120. The coiled state 340, in various implementations, may sometimes be referred to as the active state. Accordingly, the body 110 may bend or deform to grasp, hold, and so on the object or the cup 320. To make adaptable, different compositions, shapes, thicknesses, widths, and so on of the body 110 may be utilized in the holder 300 depending on a desired reaction time to grip the object or the cup 320. For example, the holder 300 may have a reaction time of 1-3 Hertz (Hz) to suit the grasping of a cup without a noticeable delay to a user.

Turning now to the release of the object or the cup 320, the controller 124 may utilize the proximity sensor(s) 330, touch sensor(s), and/or pressure(s) to determine a release for the holder 300. In response to a detected release, the controller 124 may activate the power source 122 to heat the component 130. As the component 130 heats, the MA or SMA material contracts causing the body 110 to substantially flatten or straighten to enter the uncoiled state or the inactive state and release the object or the cup 320. The body 110 may stay in the uncoiled state without applied power by the power source 122 thereby allowing efficient operation.

As another embodiment, FIG. 4 illustrates a system 400 using the actuator 100 to hold a mobile device. Regarding composition, the system 400 may include the body 410 composed of metal, plastic, composite, and so on. Furthermore, the system 400 may be attached to the dashboard, console, panel, vent, and so on of a vehicle. In one approach, the system 400 may be universal and hold mobile devices of various sizes by custom actuation.

Furthermore, the system 400 may include a proximity sensor(s) 430 that uses ultrasonic, optical, pressure, heat, magnetic, and so on sensing. When the proximity sensor(s) 430 detects a mobile device 420 near the body 410, the controller 124 may activate the power source 122. For example, the proximity sensor(s) 430 may use ultrasonic or optical detectors to identify shapes of a phone or a tablet through image recognition, thereby improving the accuracy of activation. In one approach, the body 410 may include a touch sensor(s) or a pressure sensor(s). The touch sensor(s) may detect touch by changes in surface resistance or capacitance. Regarding pressure, a pressure sensor(s) may detect a push or a pull on the body 410 or the body 110 of the actuator 100. Correspondingly, the pressure sensor(s) may also detect a force or weight of an object near the system 400. As a result, the controller 124 may use signals from the proximity sensor(s) 430 with any detected touch or pressure to activate the power source 122 to prevent erroneous triggering.

Moreover, in FIG. 4A the component 120 of the actuator 100 is heated by the power source 122 applying a voltage in response to activation by the controller 124. Correspondingly, in FIG. 4B the component 120 may spring, recoil, or trigger the body 110 into the coiled state 440 once heating beyond a certain threshold causes contraction. The coiled state 440, in various implementations, may sometimes be referred to as the active state. Accordingly, the body 110 may bend or deform to grasp, hold, and so on to the mobile device 420. To make the system adaptable, different compositions, shapes, thicknesses, widths, and so on of the body 110 may be utilized in the system 400 depending on a desired reaction time to grip the mobile device 420. For example, the system 400 may have a reaction time of 1-3 Hertz (Hz) to suit the grasping of a mobile device without a noticeable delay to a user.

Turning now to the release of the mobile device 420, the controller 124 may utilize the proximity sensor(s) 430, touch sensor(s), and/or pressure(s) to determine a release for the system 400. In response to a detected release, the controller 124 may activate the power source 122 to heat the component 130. As the component 130 heats, the MA or SMA material contracts causing the body 110 to substantially flatten or straighten to enter the uncoiled state or the inactive state and release the mobile device 420. The body 110 may stay in the uncoiled state without applied power by the power source 122 thereby allowing efficient operation.

In various implementations, the system 400 may be arranged in a cup holder to allow universal use of a component on a console or a door panel. In one approach, a pressure sensor(s) detects the mobile device 420 in the cup holder. In response, the controller 124 may activate the actuator 100 to enter the coiled state. Accordingly, the body 110 may morph to the shape of the mobile device 420 in the cup holder during coiling. In this way, the system 400 may adapt to various sizes and form factors of a mobile device thereby improving compatibility and use.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator comprising:
   a body that is bi-stable with a coiled state and an uncoiled state;
   a strip, coupled to the body, that coils the body according to a power source that activates according to a detected proximity of an object using a sensor signal; and
   a wire coupled to a back of the body opposite from the strip and the wire uncoils the body according to heat caused by the power source.

2. The actuator of claim 1, wherein the wire contracts from the heat to uncoil the body and the body is stable in the uncoiled state without the heat to the wire.

3. The actuator of claim 1, wherein the body applies a force when the strip coils according to a size or weight of the object detected by a sensor.

4. The actuator of claim 3, wherein the actuator uncoils the body to release the object from a detected pull on the object.

5. The actuator of claim 1, wherein the body applies a force when the strip coils the body according to a shape of a cup or a mobile device.

6. The actuator of claim 1, wherein the body is a bi-stable strip and the wire extends from ends of the bi-stable strip.

7. The actuator of claim 1, wherein a proximity sensor detects the proximity and a touch sensor detects a touch on the body.

8. The actuator of claim 7, wherein a controller activates the power source to control the strip according to the proximity and the touch.

9. The actuator of claim 1, wherein the strip is positioned at an end of the body.

10. An actuator comprising:
    a bi-stable body associated with an active state and an inactive state;
    a memory alloy (MA) part, coupled to the bi-stable body, that alters the bi-stable body by entering the active state according to a detected proximity of an object; and
    a MA body on a side of the bi-stable body opposite from the MA part and the MA body straightens the bi-stable body to enter the inactive state according to heat triggered by a power source.

11. The actuator of claim 10, wherein the MA body contracts from the heat to straighten the bi-stable body and the bi-stable body is stable in the inactive state without further heating.

12. The actuator of claim 10, wherein the bi-stable body applies pressure in the active state according to a size or weight of the object detected by a sensor.

13. The actuator of claim 12, wherein the actuator straightens the bi-stable body to release the object from a detected pull on the object.

14. The actuator of claim 10, wherein the bi-stable body applies pressure when the MA part causes a bend of the bi-stable body according to a shape of a cup or a mobile device.

15. The actuator of claim 10, wherein the MA body extends from ends of the bi-stable body.

16. The actuator of claim 10, wherein a controller activates the power source to control the MA part according to the proximity and touch detected by a sensor.

17. The actuator of claim 10, wherein a proximity sensor detects the proximity and a touch sensor detects a touch on the bi-stable body.

18. The actuator of claim 17, wherein a controller activates the power source to control the MA part according to the proximity and the touch.

19. An actuator system comprising:
    bi-stable actuators;
    memory alloy (MA) parts, coupled to two or more of the bi-stable actuators, that separately trigger an alteration of the two or more bi-stable actuators and an active state according to proximity of an object; and
    MA bodies coupled to the two or more bi-stable actuators that separately cause the two or more bi-stable actuators to enter an inactive state according to heat triggered by a power source, wherein a controller activates the heat to enter the inactive state.

20. The actuator system of claim 19, wherein the two or more bi-stable actuators apply pressure when each of the MA parts triggers a bend of a body according to a shape of a cup or a mobile device.

\* \* \* \* \*